Oct. 31, 1939.                F. C. BOXALL                 2,178,247
MECHANISM FOR CONVERTING ROTARY MOTION INTO RECIPROCATING MOTION
                Filed Oct. 12, 1938          2 Sheets-Sheet 1
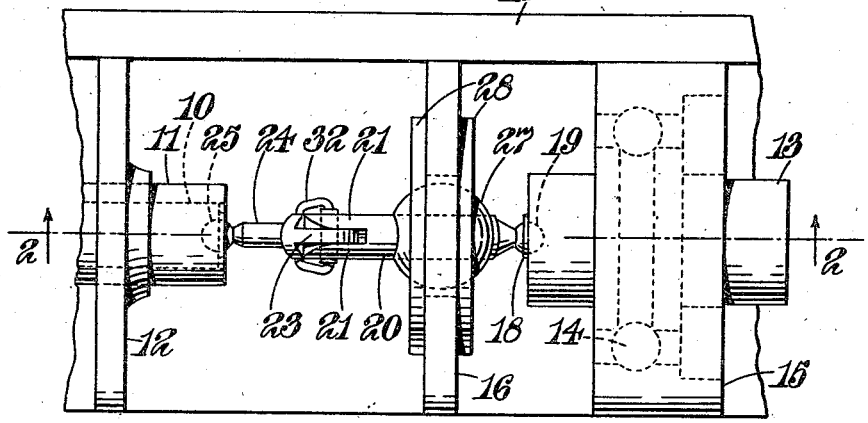
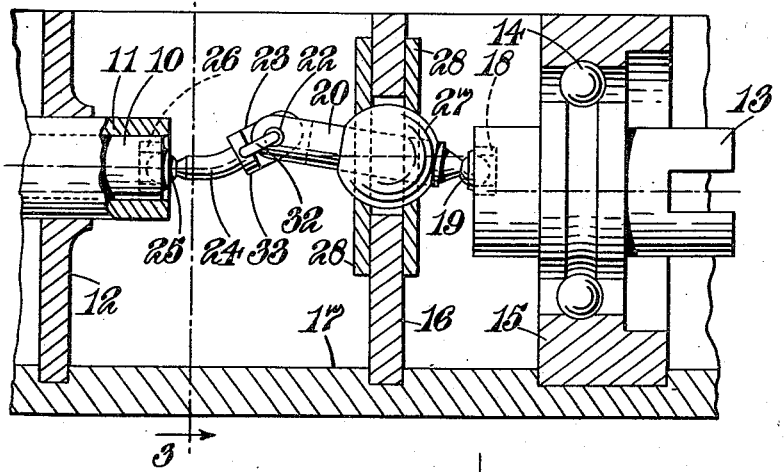
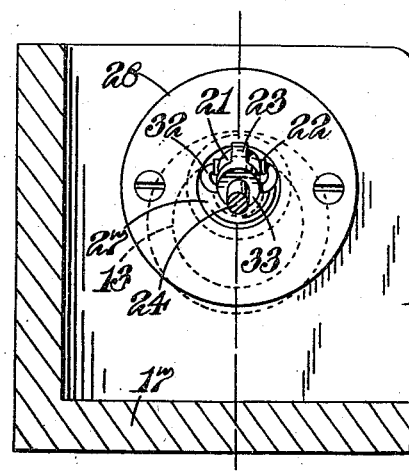
Inventor:
Frederick Charles Boxall
By Stebbins, Blenko
& Parmelee, Attys.

Oct. 31, 1939.  F. C. BOXALL  2,178,247
MECHANISM FOR CONVERTING ROTARY MOTION INTO RECIPROCATING MOTION
Filed Oct. 12, 1938  2 Sheets-Sheet 2
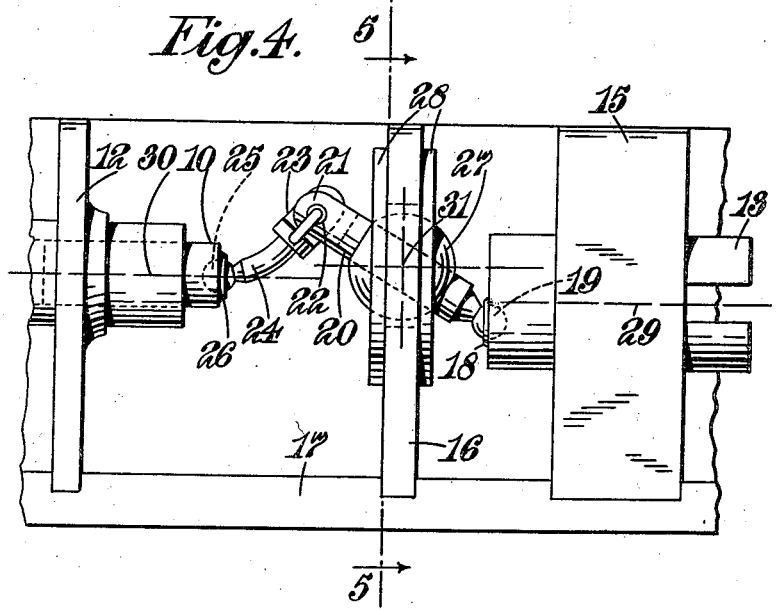
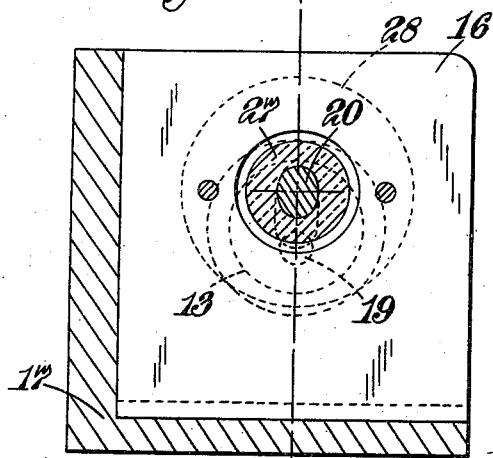
Inventor:
Frederick Charles Boxall,
By Stebbins, Blenko & Parmelee,
attys Patented Oct. 31, 1939

2,178,247

UNITED STATES PATENT OFFICE 2,178,247

MECHANISM FOR CONVERTING ROTARY MOTION INTO RECIPROCATING MOTION

Frederick Charles Boxall, London, England, assignor to Lee Guinness Hydro-Pulsator Company Limited, London, England, a British company Application October 12, 1938, Serial No. 234,678
In Great Britain October 26, 1937

6 Claims. (Cl. 74—40)

This invention is for improvements in mechanism for converting rotary motion into reciprocating motion, such as may be used for driving the plunger of a reciprocating pump from a rotating shaft; it may also be used, in suitable circumstances, for the conversion of reciprocating motion into rotary.

According to the invention, mechanism for converting rotary motion into reciprocating motion comprises, in combination, a reciprocable element, an eccentric-device rotatable about an axis parallel with the direction of reciprocation of said reciprocable element, a rod so connected to said eccentric-device that one point in its length is driven in a circle and so guided as to pass through a fixed point which is offset both laterally from the axis of rotation of the eccentric-device and longitudinally from the point of connection from the rod to the eccentric-device, and a coupling between said reciprocable element and another point on the rod.

According to another feature of the present invention, the mechanism comprises, in combination, a reciprocable element, an eccentric-device, a rod so connected to said eccentric-device that one point in its length is driven in a circle, a ball rotatably mounted in a part-spherical housing and having a bore engaging the rod, whereby the rod can slide in the bore and tilt about the centre of the ball, and a coupling between the said reciprocable element and another point on the rod.

According to another feature of the invention, the parts are so arranged, for a purpose explained hereinafter, that the point of connection of the rod to the eccentric-device, the point of the connection of the rod to the coupling, and the point of connection of the coupling to the reciprocable element can never lie on the same straight line. This condition may be achieved by ensuring that, where the axis of the reciprocable element is parallel with the axis of the shaft but displaced therefrom, the centre of the ball does not lie between the said axes, although it may lie on the same plane.

A specific embodiment of the invention will now be described by way of example with reference to the accompanying diagrammatic drawings in which:

Figure 1 is a plan view of mechanism according to the invention;

Figure 2 is an elevation being a section on the line 2—2 of Figure 1;

Figure 3 is a section on the line 3—3 of Figure 2;

Figure 4 is a view similar to Figure 2 but showing the parts in outside elevation and in a different relative position; and Figure 5 is a section on the line 5—5 of Figure 4.

As shown in the drawings, a plunger 10 of a high-speed reciprocating pump is slidable in a cylinder 11 supported by a frame-member 12. It is required to reciprocate the plunger 10 by rotating a shaft 13 which is borne in a bearing 14 carried by a frame-member 15. The frame-members 12 and 15 and also the frame-member 16 described below are supported in a housing 17 of any convenient construction.

The end of the shaft 13 is formed with an eccentric recess containing a cup 18 which receives the ball-shaped end 19 of a cylindrical rod 20, the other end of which is forked at 21 to engage a tubular gudgeon-pin 22 upon which the tongue-end 23 of a bent coupling rod 24 is pivoted. The other end of the rod is formed with a ball-end 25 which engages a cup 26 in the end of the plunger 10.

The cylindrical rod 20 is slidable in a diametral bore in a ball 27 which is supported for tilting movements in part-spherical recesses in plates 28 secured to a frame-member 16.

As can be seen from Figure 4, the axis of rotation 29 of the shaft 13 and the axis 30 of the plunger 10 are parallel and spaced apart. The centre 31 of the ball 27 lies on the side of the axis 30 remote from the axis 29. However, the axes 29 and 30 and the centre 31 lie all in the same vertical plane as may be seen from Figure 1.

The knuckle-joint constituted by the forked end 21 of the rod 20, the gudgeon-pin 22, and the tongue-end 23 of the curved rod 24, is held together by a locking wire 32 which passes along the bore of the gudgeon-pin and has its ends pressed into suitable holes in a flange 33 formed on the bent rod 24.

When the shaft 13 is rotated the ball 19 describes a circle about the axis 29. Consequently the axis of the rod 20 generates the surface of a distorted cone, the necessary tilting movement being permitted by tilting of the ball 27 in its housing 28. By reason of the fact that the centre 31 of the ball 27 is offset from the axis of rotation 29 of the shaft 13, the remote end 21 of the rod 20 does not describe a circle in a plane at right-angles to the axis 29 but describes a non-circular closed figure lying at an oblique angle to that axis. Hence, the forked end 21 has a component of movement parallel with the plunger-axis 30, and the coupling rod 24 transmits this component to the plunger which is thereby reciprocated. Figures 2 and 3 show the parts in one dead-centre position and Figures 4 and 5 show the parts in the position they assume when the shaft 13 has been rotated through 180° from the position shown in Figure 2.

It will be seen that the rod 24 and the rod 20 experience considerable relative angular movement so that the knuckle-joint illustrated is more suitable than a ball joint at this point. However, where a knuckle-joint is used, it is necessary so to design the mechanism that the centre of the ball 25, the centre of the gudgeon-pin 22, and the centre of the ball 19 shall never lie in the same straight line in space otherwise the knuckle-joint will lock in certain positions of the parts. There are many ways of ensuring that the three points above mentioned shall not lie in a straight line, but one way is to arrange that the centre of the ball 27 does not lie between the axes 29 and 30; this arrangement is clearly shown in Figure 4.

It will be seen that the coupling rod 24, in elevation, oscillates with respect to the axis 30 of the plunger. In order to bring the mean position of the left-hand end of the rod 24 near to the axis 30, and thereby simplify the construction of the ball-housing 26, the rod 24 is curved as shown so that its left-hand end is approximately in line with the plunger.

The lengths of the rods 20 and 24 and the distance between the ball centre 31 and the axes 29 and 30 may be so designed as to give any desired stroke to the plunger 10.

The advantages of the invention are that it is possible to arrange the plunger and shaft substantially in line, whereby a compact assembly is possible, and that the mechanism is capable of being driven at high speeds for long periods without undue wear.

I claim:

1. Mechanism for converting rotary motion into reciprocating motion comprising, in combination, a reciprocable element, an eccentric-device rotatable about an axis parallel with the direction of reciprocation of said reciprocable element, a rod connected to said eccentric-device at one point in its length so that the rod at the point of connection is driven in a circle, said rod being so guided as to pass through a fixed point which is offset both laterally from the axis of rotation of the eccentric-device and longitudinally from the point of connection of the rod to the eccentric-device, and a coupling between said reciprocable element and another point on the rod.

2. Mechanism for converting rotary motion into reciprocating motion comprising, in combination, a reciprocable element, an eccentric-device rotatable about an axis parallel or approximately parallel with the direction of reciprocation of said reciprocable element, a rod connected to said eccentric-device at one point so that the point in its length is driven in a circle, a ball rotatably mounted in a part-spherical housing and having a bore engaging the rod whereby the rod can slide in the bore and tilt about the centre of the ball, which centre is offset laterally from the axis of rotation of said eccentric device and a coupling between said reciprocable element and another point on the rod.

3. Mechanism for converting rotary motion into reciprocating motion comprising, in combination, a reciprocable element, an eccentric-device rotatable about an axis substantially parallel with the direction of reciprocation of said reciprocable element, a rod connected to said eccentric-device so that the point of connection is driven in a circle, a coupling between said reciprocable element and another point on the rod, and a ball rotatably mounted in a part-spherical housing and having a bore engaging the rod between its points of connection to the eccentric-device on the one hand and the coupling on the other hand and having its center displaced laterally from the axis of rotation of said eccentric device whereby the rod can slide in the bore and tilt about the centre of the ball.

4. Mechanism as claimed in claim 1, wherein the parts are so aranged, for the purpose described, that the point of connection of the rod to the eccentric-device, the point of connection of the rod to the coupling, and the point of connection of the coupling to the reciprocable element can never lie on the same straight line.

5. Mechanism for converting rotary motion into reciprocating motion comprising, a reciprocable element, an eccentric-device rotatable about an axis parallel with the direction of reciprocation of said reciprocable element but displaced therefrom, a rod connected to said eccentric-device at one point in its length so that the rod at the point of connection is driven in a circle, a ball having its centre displaced laterally from the axis of rotation of the eccentric device lying in the plane containing the axes of the eccentric-device and reciprocable element but not lying between them, and a part-spherical housing in which the ball is rotatably mounted whereby the rod can slide in the ball and tilt about the centre of the ball.

6. Mechanism as claimed in claim 2, wherein the said coupling is a curved rod for the purpose described.

FREDERICK CHARLES BOXALL.